A. W. NIELSEN.
COMBINED MEASURING AND FILLING APPARATUS.
APPLICATION FILED JUNE 1, 1916.
1,271,749.
Patented July 9, 1918.
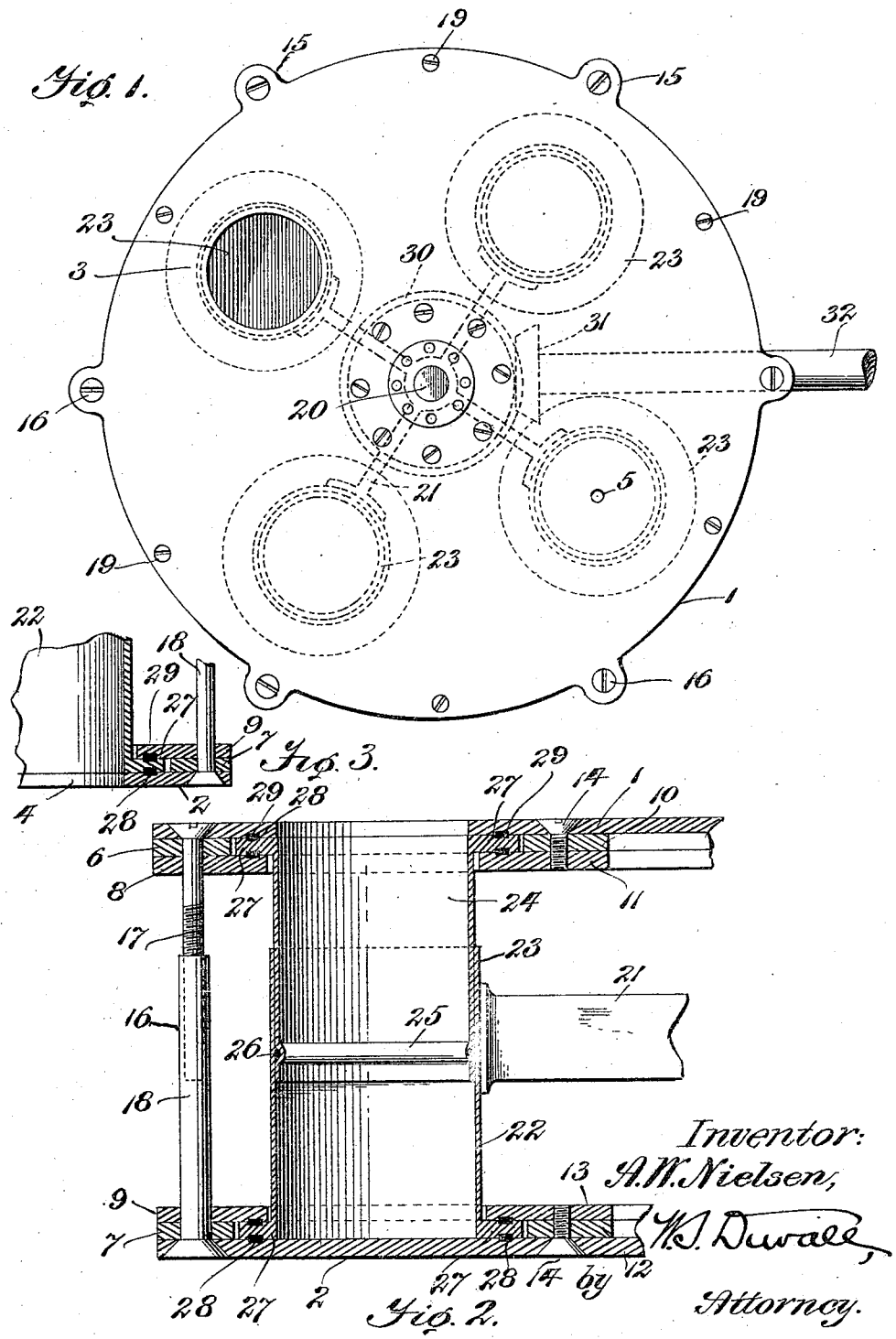
Inventor:
A. W. Nielsen,
Attorney.

UNITED STATES PATENT OFFICE.

AAGE W. NIELSEN, OF CHICAGO, ILLINOIS.

COMBINED MEASURING AND FILLING APPARATUS.

1,271,749.　　　　　　Specification of Letters Patent.　　Patented July 9, 1918.

Application filed June 1, 1916. Serial No. 101,035.

*To all whom it may concern:*

Be it known that I, AAGE W. NIELSEN, a citizen of the United States, residing at Chicago, in the county of Cook and State of Illinois, have invented a new and useful Combined Measuring and Filling Apparatus, of which the following is a specification.

This invention relates to improvements in measuring and filling apparatuses, the objects in view being to provide an apparatus for this purpose capable of being produced and sold at a comparatively small cost, which is adapted for measuring and filling containers with liquid, semi-liquid, granular or other substances, and in which the said measuring-devices are capable of being adjusted simultaneously so as to deliver predetermined quantities to said containers.

Other objects and advantages of the invention will hereinafter appear, and the novel features thereof will be particularly pointed out in the appended claims.

Referring to the drawing,—

Figure 1 is a top plan view of a combined measuring and filling apparatus embodying my invention;

Fig. 2 is a fragmentary view in radial section; and

Fig. 3 is a similar view at the discharge-side of the apparatus, the upper portion being broken away.

Similar numerals of reference indicate similar parts in all figures of the drawing.

In carrying out my invention, I employ a pair of preferably circular disks, 1 and 2, the upper disk 1 having at one side near its edge a circular feed-opening 3, and the lower disk 2, having at a point near its edge and preferably diametrically opposite the feed-opening, a discharge opening 4 (see Fig. 3).

Above the discharge opening 4, and for the purpose of destroying the vacuum, I form in the upper disk a small relief-perforation 5.

Applied to the underside of the upper disk 1, and to the upper side of the lower disk 2, and corresponding thereto in diameter, are respectively upper and lower spacing-rings 6 and 7, and under the former and above the latter are retaining-rings somewhat wider than the spacing-rings and designated respectively as 8 and 9. Corresponding spacing and retaining-rings, designated respectively as 10 and 11 and 12 and 13, are applied to the inner faces of the disks 1 and 2 and are inclosed by the spacing-rings 6, 7, 8, and 9. Screws 14 inserted through each of the disks 1 and 2, serve to retain the rings 10, 11, 12, and 13 in position.

Any means may be employed for adjusting the disks 1 and 2 and the parts carried thereby to and from each other, and I have herein shown one simple means to which, of course, I do not wish to be limited. In the present instance I preferably form the disks 1 and 2 and the outer rings carried thereby with off-sets 15, perforating the same to receive adjustable telescopic adjusting-bolts 16. Each bolt consists of a male externally threaded member 17 which passes through the disk 1, and a female internally threaded member 18 which passes in an opposite direction through the lower disk 2 and receives the lower end of the threaded member 17. It will be obvious that by rotating either of these members the threads of which engage each other the disks will be relatively adjusted. Between these adjusting-bolts 16 screws 19 are employed for retaining the outer spacing and retaining-rings in position.

Upon a shaft 20 axially located in the disks 1 and 2, I may locate, to turn therewith, a series of radial spider-arms 21, at the outer end of each of which is secured the lower member 22, of a telescopic measure 23, the upper member 24, terminating within the lower member. In order to produce a tight joint between these two telescopic members 22 and 24, the latter may have formed near its lower end an annular external packing-groove 25, in which is located a suitable packing material 26. Each of the members 22 and 24, is provided at its outer end with an annular surrounding flange 27, the same fitting between the retaining-rings 8, 9, 11 and 13 and occupying the spaces produced by the spacing-rings 6, 7, 10 and 12. If desired shallow grooves 28 may be formed in the upper and lower sides of the flanges 27 of the members 24 and 22, and also at corresponding points in the disks and retaining-rings, and in such grooves there may be seated suitable packing-rings 29.

The shaft 20 may be operated either mechanically or by hand, and if mechanically, by any suitable mechanism adapted for the purpose. In the present instance I have indicated by dotted lines a beveled gear 30 upon the shaft 30, the same being driven by a companion gear 31 at the end of a suitable drive-shaft 32.

This completes the construction of my invention, and it will be seen that the same is both simple and economical; also that the capacities of the several measures may be regulated so as to receive and subsequently discharge predetermined quantities in receptacles or retainers located under the discharge opening 4.

The operation of the invention will be readily understood, it being apparent that the measures are successively brought under the feed-opening 3, where they receive from any suitable source, their supplies, and subsequently successively brought over the discharge-opening 4 where they discharge their contents into containers or receptacles placed in position under said apparatus. Of course, it will be understood, that any suitable supporting-frame may be employed in conjunction with the apparatus and which is calculated to conveniently support the apparatus in position adjacent the discharge leading from some source of supply. As such forms no part of my present invention, I have not undertaken to illustrate the same.

Having described my invention, what I claim, is:

1. In an apparatus of the class described, the combination with upper and lower stationary disks, the former having a feed-opening and the latter a discharge-opening out of alinement with said feed-opening, spacing-rings secured to the inner faces of both disks and surrounding the feed and discharge-openings, retaining-rings secured to each of the spacing-rings and of less internal diameter than the same and also surrounding said feed and discharge-openings, and means for adjusting the two disks with relation to each other, of a series of collapsible measuring vessels open at their opposite ends and provided with opposite outwardly disposed end-flanges engaged by the retaining-rings, a central rotatable support, and arms radiating from the same to said vessels.

2. In an apparatus of the class described, the combination with upper and lower stationary disks, the former having a feed-opening and the latter a discharge-opening out of alinement with said feed-opening, retaining-rings secured to and spaced from the inner faces of both disks and surrounding the feed and discharge-openings, and means for adjusting the two disks with relation to each other, of a series of collapsible measuring-vessels open at their opposite ends and provided with outwardly disposed end-flanges engaged by the retaining-rings and having sliding contact with the inner faces of the disks, a central rotatable support, and arms radiating from the same to said vessels.

3. In an apparatus of the class described, the combination with upper and lower disks, the former having a feed-opening and the latter a discharge-opening out of alinement with the feed-opening, retaining-rings secured to and spaced from the inner faces of both disks and surrounding the feed and discharge-openings, and means for adjusting the two disks with relation to each other, of a series of collapsible open ended measuring-vessels provided with outwardly disposed end flanges engaged by the retaining-rings and having sliding contact with the inner faces of the disks, a central support, arms radiating from the same to said vessels, and means for moving or rotating the vessels and disks with relation to each other whereby to bring the measuring vessels successively under and over the feed and discharge-openings respectively.

4. In an apparatus of the class described, the combination with upper and lower disks, the former having a feed-opening and the latter a discharge-opening out of alinement with the feed-opening, spacing-ring surrounding the openings and positioned at the inner faces of the disks, retaining-rings positioned against the spacing-rings and smaller than the same, and threaded adjusting-rods and sleeves passed through the upper and lower disks, their spacing and retaining-rings, whereby to adjustably connect said disks, of a series of telescopic open ended measuring-vessels located between the disks and having opposite outwardly disposed end-flanges contacting with the disks and engaged by the retaining-rings, a central rotatable support, and supporting-arms radiating therefrom and connected to the measuring-vessels.

In testimony whereof I have signed my name to this specification in the presence of two subscribing witnesses.

AAGE W. NIELSEN.

Witnesses:
W. S. DUVALL,
E. E. ELLIS.

Copies of this patent may be obtained for five cents each, by addressing the "Commissioner of Patents, Washington, D. C."